April 22, 1930. L. NAGY 1,756,002
AUTOMATIC SANITARY SUGAR BOWL
Filed Sept. 12, 1928 2 Sheets-Sheet 2
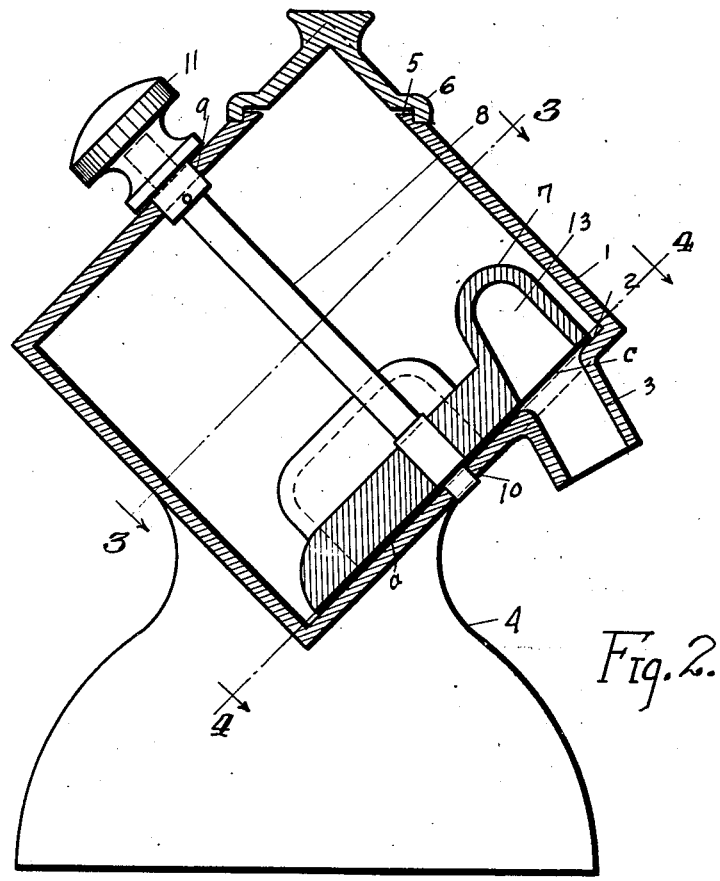
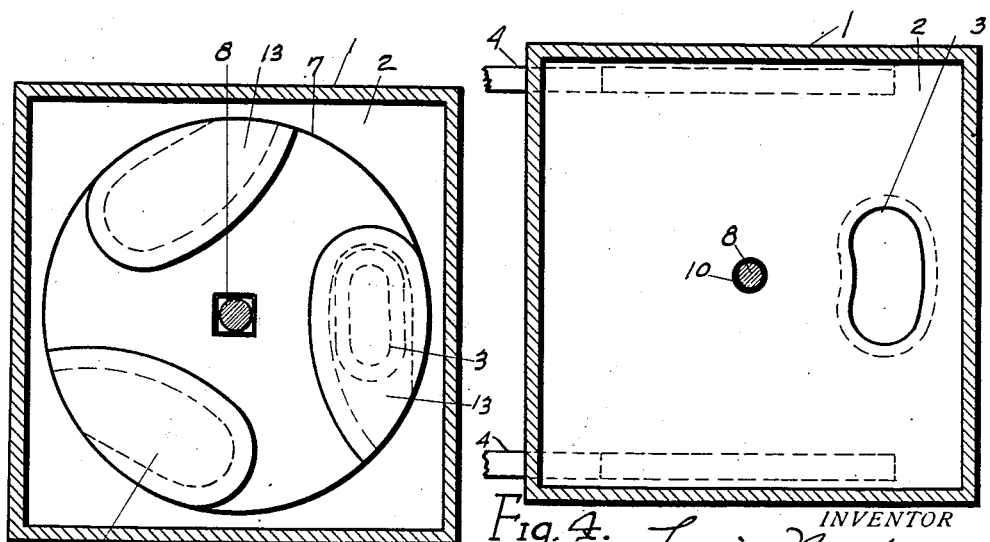

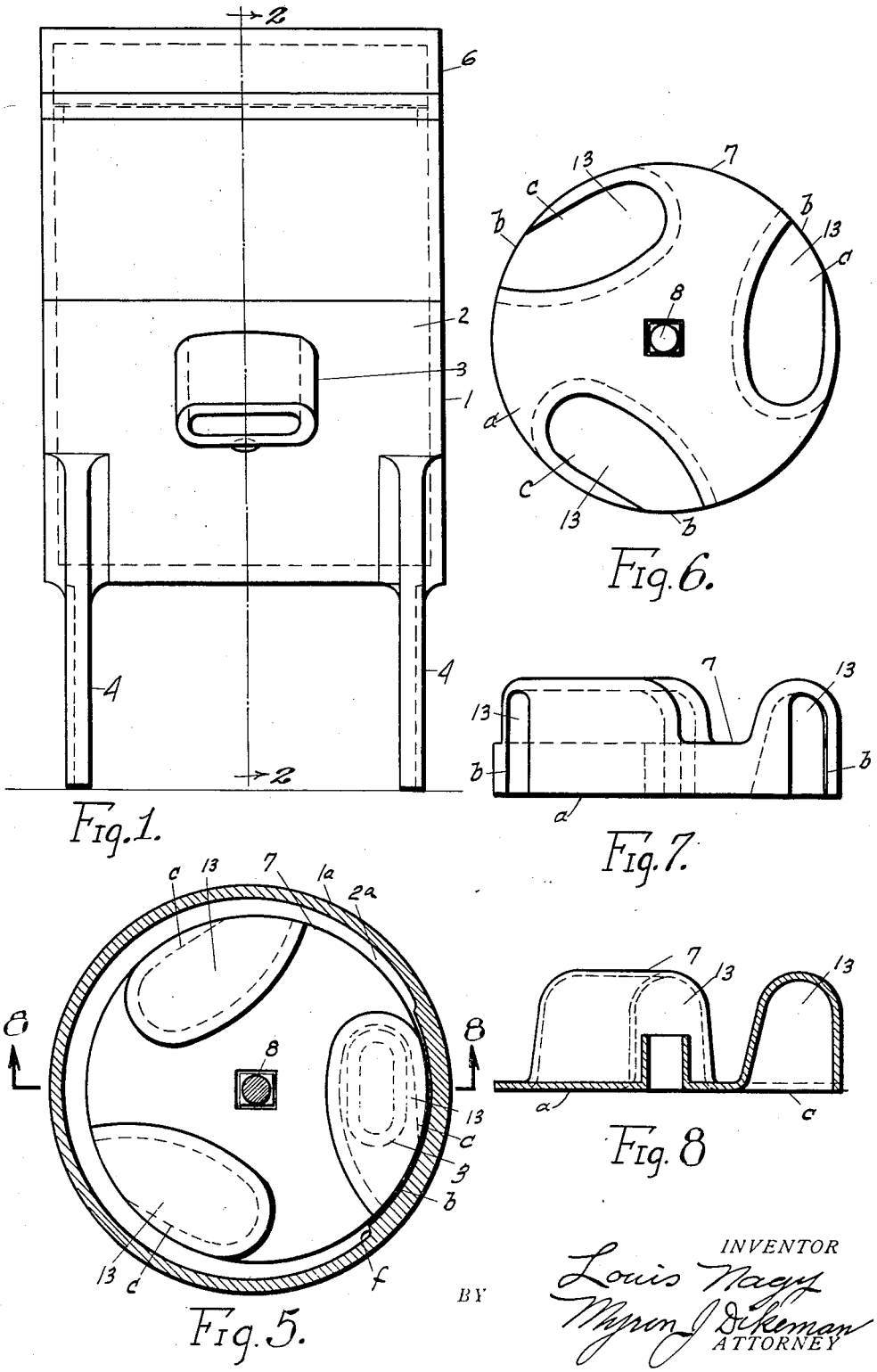
April 22, 1930.  L. NAGY  1,756,002
AUTOMATIC SANITARY SUGAR BOWL
Filed Sept. 12, 1928   2 Sheets-Sheet 1

Patented Apr. 22, 1930

1,756,002

UNITED STATES PATENT OFFICE

LOUIS NAGY, OF DETROIT, MICHIGAN, ASSIGNOR, BY DIRECT AND MESNE ASSIGNMENTS, OF ONE-HALF TO STEPHEN F. HALACH, OF DETROIT, MICHIGAN

AUTOMATIC SANITARY SUGAR BOWL

Application filed September 12, 1928. Serial No. 305,368.

The object of my invention is to provide a sugar bowl suitable for table or counter use that would deliver an apportioned amount of sugar therefrom as the operating handle is rotated.

Another object is to produce a sanitary sugar bowl that is completely closed and can be operated conveniently from the outside, yet inaccessible, to the user.

A further object is to produce an automatic sanitary sugar bowl containing a measuring unit, that will operate to pulverize any lumps within the sugar before entering the measure disk.

A still further object is to produce a measure unit that can be installed within the container filled with powdered materials, and which will deliver a predetermined amount of materials therefrom at successive turns of the unit.

Another object is to provide an automatic sugar bowl that is simple in construction, easily and efficiently operated and can be manufactured at a low cost.

These several objects are attained in their preferred form by the construction and arrangement of parts more fully hereinafter set forth.

Similar parts on all drawings are marked by similar numerals.

Fig. 1, is a side view of the device, showing the supporting legs and the outlet spout.

Fig. 2, is a sectional view taken on line 2—2 of Fig. 1, showing the interior arrangement of the operating disks and shaft.

Fig. 3, is a sectional view taken on line 3—3 of Fig. 2, showing the relative position of the measuring disk on the flat bowl bottom.

Fig. 4, is also a sectional view taken on line 4—4 of Fig. 2, showing the arrangement of the bearings and the outlet spout opening through the bottom bowl wall.

Fig. 5, is likewise a sectional view taken on line 3—3 but substituting a cylindrical bowl instead of a square bowl, section, first illustrated in Fig. 3, and showing the application of the measuring disk to the round bowl provided with closing means for the measuring compartments in one position during its rotation.

Fig. 6, is a bottom view of the measuring disk, showing the open recess compartments formed therein.

Fig. 7, is a side view of the measuring disk, showing the general arrangement of the rim openings.

Fig. 8, is a sectional view of the measuring disk when cut along the line 8—8 of Fig. 5, showing an alternate structure for the disk when formed of pressed sheet metal.

I will now describe more fully the detailed construction of my device, referring to the drawings and the marks thereon.

In general my device comprises a closed chamber bowl, provided with an opening at the top for inserting granulated sugar therein and an outlet spout formed through the bottom wall. Within the bowl is mounted a rotatable disc formed with a series of recessed chambers, all opening in the bowl chamber around the edge of the disk, and at one position of the disk each of the recess chambers is passed over the outlet spout and allowed to discharge the granulated sugar from the bowl as may be contained therein.

The said recess chambers are each again refilled as the disk is rotated with the bowl, automatically, alternately filling and discharging through the outlet spout.

The device is preferably made of pressed sheet metal, or of glass or porcelain materials, as may be desired, depending upon the place it is to be used. Any suitable material that will provide free operation of the measuring disk will work equally as well. The sugar bowl is preferably made with a uniform cross section and may be either round or square or any other design desired to meet the varied conditions, depending upon the places which the bowl is to be used, but in all cases the bottom wall must be formed with a flat interior surface.

I have illustrated my device in preferred form with a cube shaped bowl section 1, formed with a flat bottom section 2, and provided with an outlet spout 3. The cube shaped bowl —1— is tilted and preferably positioned at an angle with the base and supported by two flat leg members —4— projecting therefrom. The tilting of the bowl —1— places both the operating handle and the spout in a more convenient operating position. The top side of the bowl is provided with the opening —5— for admitting powdered sugar therein, and is closed by the cover —6—, which fits securely thereon. Within the bowl —1— is mounted a rotatable measuring disk —7— formed with the flat bottom surface —a—, which rests upon the flat bottom —2— of the bowl. The disk —7— is rotatably mounted on the shaft —8—, which passes through the center of the disk and at right angles thereto, the disk —7— and shaft —8— rotating together as one member. The shaft —8— is rotatably mounted in the bearings —9— and —10— positioned along the axis of bowl —1— with the upper end of shaft —8— projecting through the bearing —9— and above the bowl. The operating knob —11— is attached to the outer end of shaft —8— providing means for rotating the shaft, and attached measuring disk —7—. The measuring disk —7— is circular in form concentric about the axis of its rotation and of a diameter to nearly fill the bottom surface of the bowl, providing only a small open space between the disk rim and the bowl wall. Within the disk —7— are series of recess chambers —13— all closed at the top of the disk, but provided with openings —b— and —c—, through the rim and bottom disk walls. The bottom recess opening —c— is closed by the flat bowl wall —2—, while the rim opening —b—, is open in the bowl chamber at all positions. The chamber recesses —13— are filled with granulated sugar through the rim opening —b— as the disk —7— is rotated by the knob —11—, and any lumpy particles as may be contained within the sugar are broken up and pulverized by the irregular top surface of the disk and grinding between the edge of the disk and the bowl walls as the same are drawn through the narrow space before entering the chambers —13—. The size of the recesses may be pre-determined as desired, preferably containing about one teaspoonful for each recess when designed for table use, although the size and the capacity of the disk recesses may be varied as desired. Through the bottom wall —2— of the bowl —1— is formed an outlet spout and opening —3— positioned near the upper edge of the bowl and in line with the bottom disk openings —c— for allowing the sugar to pass from the disk recesses as they are successively passed thereover, the spout —3— being placed at the upper side of the bottom to prevent the sugar from easily passing from the bowl through the recess and spout, should the disk be left in an open position, and for more conveniently receiving the discharged sugar into a cup or receiving vessel.

For sanitary purposes and for table and counter use the device may be made wholly of glass, porcelain or like material such as may be readily adapted to the designed sections. Should the device be applied as a measuring unit for other powdered materials, sections of the container would then preferably be made of metal.

Fig. 5, illustrates the cross section of a cylindrical bowl —1ª— where the disk —7— is positioned at one side of the bottom bowl section —2ª— and on the spout side of the bowl so designed and placed that the bowl wall —f— will completely cover the closed disk rim opening —b— when the chamber compartment —13— is discharging the powdered material through the spout opening —3—. The remaining operation is the same as heretofore described.

Fig. 7, illustrates the measuring unit as same would appear when made of glass or earthenware.

Fig. 8, illustrates the same disk formed of pressed sheet metal, although of the same design and compartment openings.

Having fully described my automatic sanitary sugar bowl, what I claim as my invention and desire to secure by Letters Patent is:

1. An automatic sanitary sugar bowl adapted for delivering sugar in measured quantities, comprising a hollow bowl casing formed with a flat bottom section therein and provided with a rigid top section across the opposite side of the bowl, an operating shaft rotatably mounted within the top and bottom section of the bowl, positioned along the center axis thereof, a measuring disk formed with one flat side mounted on said operating shaft within said bowl casing positioned with the flat disk side resting on the flat bowl bottom section and rotatable thereon with the shaft, means mounted on said shaft for causing rotations of above shaft and attached measuring disk within the bowl, said measuring disk being formed with a series of recessed chambers therein and each chamber having a rim and bottom wall opening, an outlet spout formed through the bowl bottom and opening into the bowl chamber beneath the measuring disk positioned therein to coincide with each recess chamber bottom wall opening during one position of its rotation.

2. An automatic sanitary sugar bowl adapted for delivering measured quantities of powdered sugar, comprising a hollow bowl casing mounted on suitable leg supports and having an opening formed in the top wall thereof, a cover section fitted over the said opening, said bowl being formed with a flat bottom section therein and with a rigid top section at the opposite side of the bowl, an operating shaft rotatably mounted through bearings in the top and bottom wall section positioned along the axis of said bowl and projecting outside the bowl wall at the top end thereof, an operating handle mounted on the said shaft, a measuring disk having a flat side mounted on said operating shaft and rotatable therewith positioned within the bowl with the flat disk side resting on flat bowl bottom, said measuring disk being formed with a series of recess chambers around the outer section thereof, each recess chamber having a rim and bottom wall opening, an outlet spout formed through the bottom wall positioned beneath the measuring disk to coincide with each bottom disk opening during one position of its rotation.

3. A measuring disk adapted to be used for delivering predetermined quantities of powdered materials, and used in combination with a flat bottom walled chamber, comprising a flat bottom circular disk section having means for rotating said disk upon a flat bottom supporting surface, and capable of being rotated thereon, said disk being formed with a series of recess chambers around the outer rim, all closed at the top but each recess chamber being provided with a separate rim and bottom wall opening all positioned at equal distances from the center of rotation of the disk.

In witness whereof I sign this specification.

LOUIS NAGY.